May 14, 1929.  H. B. SHERMAN  1,713,099
STEEL LUMBER
Filed May 4, 1926   2 Sheets-Sheet 1
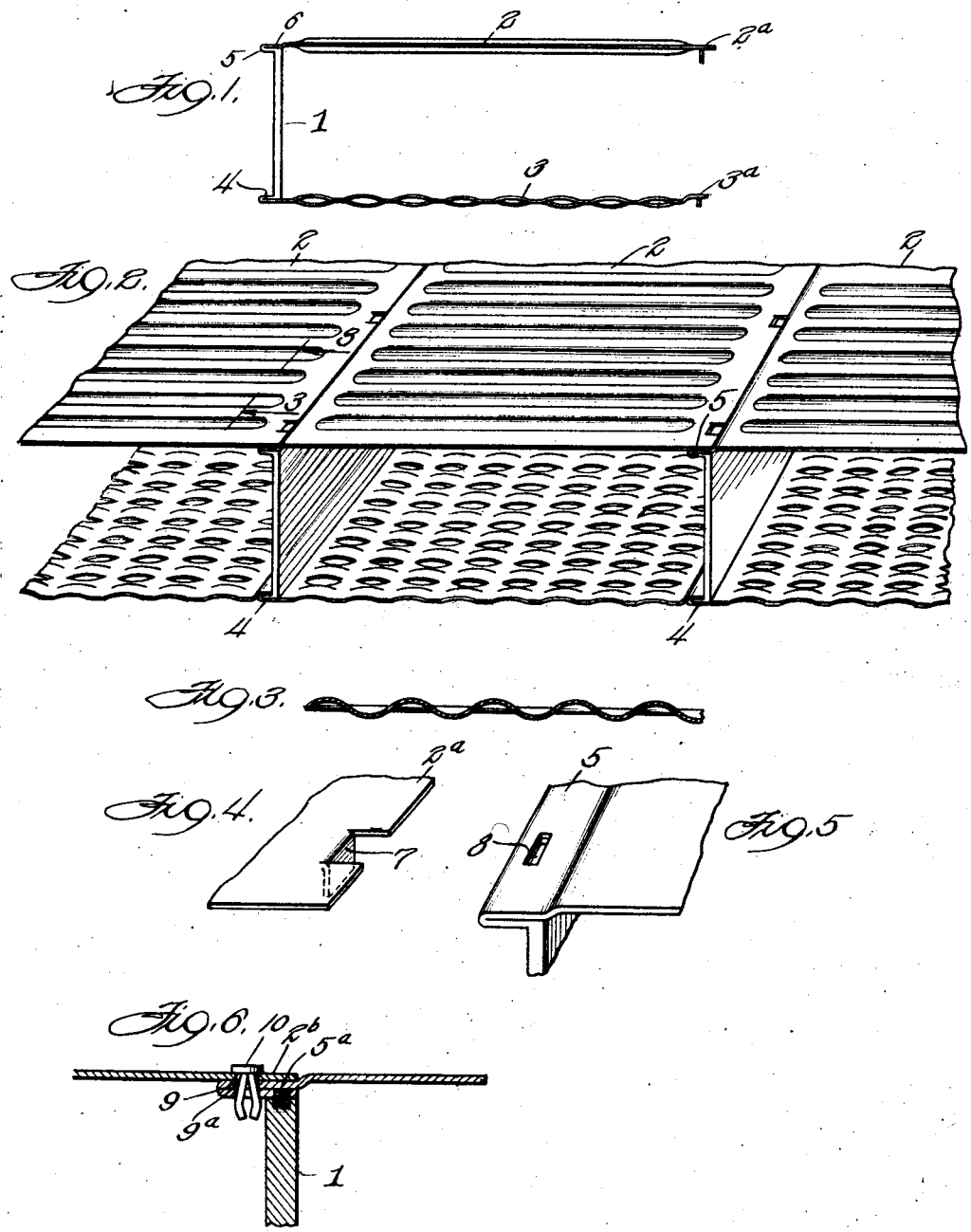
Inventor:
HOWARD B. SHERMAN
By Jones, Addington, Ames & Seibold
Attys.

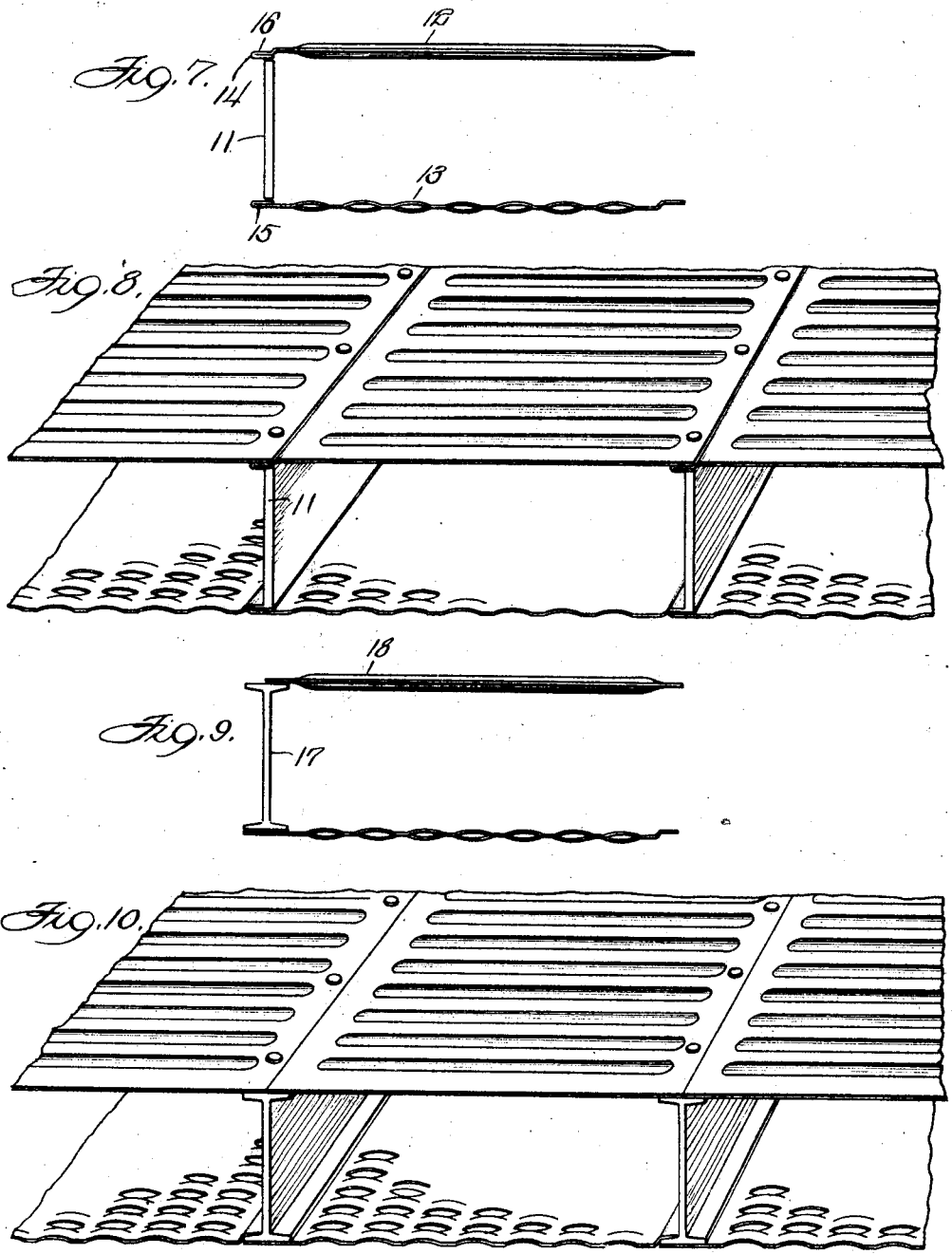

Patented May 14, 1929.

1,713,099

UNITED STATES PATENT OFFICE.

HOWARD B. SHERMAN, OF BATTLE CREEK, MICHIGAN; IDA M. SHERMAN EXECUTRIX OF SAID HOWARD B. SHERMAN, DECEASED.

STEEL LUMBER.

Application filed May 4, 1926. Serial No. 106,639.

My invention relates to steel lumber and it has special reference to steel lumber sections that are utilized in a building construction.

More particularly my invention has special reference to steel lumber that may serve in a building construction as a substitute for wooden joists, wooden rafters, wooden studs, wooden lathing, wooden flooring and the like and, at the same time, perform the functions required of such corresponding wooden members in a much more satisfactory manner. As a result of this present invention, a building construction embodying my steel lumber may be substantially fire-proof or, at least, the fire hazard thereof may be reduced to a minimum.

This steel lumber may be conveniently and economically manufactured from a single rolled section or unitary steel member and subsequently formed into the necessary shape whereby it may then serve most satisfactorily as a substitute for the usual wooden members that have heretofore entered into building construction.

Also, as a modification thereof, the steel lumber of this present invention may be conveniently and economically manufactured from a plurality of members that are permanently secured together at the factory, or before installation, to form a self-contained combination section that can be readily handled, shipped and installed without employing any skilled labor, such as skilled metal workers and the like.

My invention, broadly considered, consists of a self-contained unitary U-shaped lumber section which can be fabricated completely at the factory, or before installation, with all of the constituent parts permanently and preferably integrally formed, so that it can be shipped, handled and installed as a unit, the same comprising essentially a combination U-shaped steel lumber section possessing a relatively heavy or thick studding portion to serve as the weight-supporting element in a building structure, such as a joist or studding, and relatively thin sustaining plate portions permanently formed upon the studding portions and extending laterally therefrom in the same direction, each being of sufficient width, in conjunction with the adjoining lumber sections to span the spaces between adjacent studding portions, said sustaining plate portions serving as lathing, either external or internal, on the ceiling or side walls, flooring, or the like, of a building structure.

To compare specifically wooden lumber members that have heretofore entered into a building construction with the steel lumber combination sections of my present invention, the wooden lumber sections, such as joist, rafters, studs, lathing, flooring and the like, are made in separate and individual pieces, each requiring a separate manufacturing operation, as well as separate handling and assembling, in order to incorporate them into a building construction, and matching and fitting of such wooden lumber sections require expert labor and considerable field work.

The steel lumber of this present invention constitutes a built-up section that may serve as a combination studding portion and interior lathing and external lathing portion, or as a combination joist portion and lathing and flooring portions, or any other suitable combination of members entering into a building construction, such as a combination of relatively thick or heavy weight supporting portions, and relatively thin or light sustaining portions.

An object of this invention is to provide steel lumber sections from which a building construction may be fabricated which comprises essentially a relatively heavy or thick studding portion to serve as the weight-supporting element and relatively thin sustaining plate portions permanently formed upon the studding portion and extending laterally in the same direction therefrom to serve as lathing, either externally or internally on the ceiling, side walls, flooring, or the like, and means for securing the steel lumber sections to one another so as to be so simply, conveniently and readily applied that no skilled labor need be utilized for this purpose.

A further object of this invention has reference to steel lumber sections from which a building construction may be fabricated and the method of manufacturing the same, the sections of which comprise initially a relatively heavy or thick studding portion to serve as the weight-supporting element and relatively thin sustaining plate portions permanently formed upon the studding portion and extending laterally therefrom, the upper sustaining plate portion being so reenforced to serve as a flooring member and the lower sustaining plate portion being slit and deformed to serve as a lathing member.

Other objects of my invention will be hereinafter described, and for a better understanding of the nature and scope of this invention, reference may be had to the accompanying drawing, in which:

Figure 1 is an end elevational view of the preferred form of this invention, showing the sustaining plate members as being integrally associated with the studding member;

Fig. 2 is a perspective view showing the method of assembling the lumber sections of Fig. 1 in a building construction;

Fig. 3 is a sectional view on the line 3—3 of Fig. 2;

Fig. 4 is a perspective view of a fragment of the sustaining plate portion, showing the tongue member which forms a part of the means for fastening the adjacent lumber sections to each other;

Fig. 5 is a perspective view of a fragment of the studding portion showing the groove in which the tongue member is held;

Fig. 6 is an elevational view of a modified form of fastening means for securing adjacent lumber sections to each other;

Fig. 7 is an end elevational view of a modified form of this invention showing the sustaining members as being permanently secured to the studding member;

Fig. 8 is a perspective view showing the assembly of the lumber sections of Fig. 7;

Fig. 9 is an end elevational view of a further modification of this invention; and Fig. 10 is a perspective view showing the assembly of the lumber sections of Fig. 9.

The term "studding portion" as used herein, contemplates a relatively thick or heavy weight, load or other stress supporting portion of a building construction or structure, and comprises in its meaning such members as joists, studs, and the like, that are adapted to serve as the weight-supporting elements or members of a building construction.

Likewise the terms "sustaining plate portion," "lathing portion" and "flooring" are used synonymously and comprise in their meaning the flooring, the lathing, the latter either external or internal on the ceiling, side walls, or the like, which elements of a building structure are relatively thin and light in comparison to the studding portion, and are of sufficient width, in conjunction with the adjacent lumber sections in a building construction, to span the space between adjacent studding portions.

Referring to Figs. 1 and 2, the self-contained unitary steel lumber section comprises a relatively thick weight-supporting studding portion 1, and the sustaining plate portions 2 and 3, which extend laterally and in the same direction from the studding portion 1 and are adjacent to its edges. The sustaining plate portion 3 is shown as being slit and deformed and, therefore, may serve as lathing, while the sustaining plate portion 2 is shown as being corrugated and may serve as a reinforced flooring. The sustaining plate portion or lathing portion 3 is preferably formed by cutting a plurality of rows of parallel, adjacent, spaced-apart slits, after which the material between alternate slits is deformed to extend above the plane of the surface and the material between the intermediate slits is deformed to extend below the plane of the surface. It is to be observed that the process of manufacturing this lathing portion may be performed in any suitable stamping machinery of the usual type and that the corrugations may be formed in the sustaining plate portion 2 simultaneously with the deformities in the lathing portion in the embodiment where the sustaining plate portions are integrally formed.

The steel lumber section is preferably formed from a rolled unitary section which is subsequently formed into a U-shape, as shown. In giving the section its U-shape, the relatively thin plate sustaining portions are bent at right angles to the relatively thick studding portion, and at a short distance therefrom said sustaining plate portions are bent back upon themselves to form flanges 4 and 5. As shown in Fig. 2, the flange 4, thus formed, has its lower surface preferably coplanar with the lower surface of the lathing portion 3, while the flange 5, by means of an offset in the plane of the sustaining plate member, is depressed below the upper surface of the flooring portion 2, thereby providing a recess 6 in order that the outer edge of the flooring portion of the next adjoining lumber section may rest upon the flange 5 and, at the same time, permit of this flooring portion and that of the adjoining lumber section being in the same plane.

In much the same manner, the surfaces of the latching portions of the adjacent lumber sections are positioned in the same plane; the only difference being that the edge of the adjacent lumber section is offset to rest upon the flange 4.

In Fig. 2 the U-shaped self-contained steel lumber sections of Fig. 1 are shown in an assembled position in a building construction. The corrugated sustaining plate portions 2 constitute a coplanar surface that may serve as the flooring of an upper story. Likewise, the sustaining plate portions 3 are coplanar, and by reason of their being slit and deformed, may serve as lathing for the ceiling of the lower story of a building construction. The relatively thick studding portions serve as the weight-supporting elements of the building.

The self-contained built-up steel lumber section of Figs. 1 and 2 may be made up into staple lengths, namely, 12 feet, 14 feet, 16 feet, and the like, corresponding to the standard lengths in which wooden lumber heretofore employed in building construction was furnished. In conformity with standard dimensions and spacing of members employed in building construction, when wooden lumber is utilized, the studding portion 1 may, for illustration, be from 4″ to 6″ wide or wider, and about ¼″ or more in thickness, and the sustaining portions 2 and 3 may be 12″, 16″, or 24″ wide, or the like, and approximately $\frac{1}{32}$″ thick or more.

In building construction, it is customary to space the studdings, namely, the joists and studs on 16″ centers and for this reason 16″ may be adopted as a suitable and convenient transverse dimension for the sustaining plate portions 2 and 3. The depth of the studs, joists and the like usually entering into a standard building construction often varies from 4″ to 6″, and these transverse dimensions may be adopted for the studding portion 1 of this present steel lumber section.

It is to be understood, however, that this invention is not to be limited by the dimensions herein specified, inasmuch as it may be desirable to space the studding portions of adjacent lumber sections greater or less distances from each other than those mentioned, and also the depth of the studding portions may be increased or decreased as desired, as well as the thickness thereof. The same comments pertain to the dimensions herein specified for the sustaining plate portions. All dimensions are given as merely illustrative.

To hold the sustaining plate portions of one lumber section in contact with the studding portions of the adjacent lumber sections, a tongue member 7 is formed on the edge of the sustaining plate portion 2ᵃ and inserted in an aperture 8 in the flange 5. It will now be observed that the self-contained steel lumber section when assembled into the building construction, does not require the aid of skilled labor, particularly metal workers, because such steel lumber sections are completely organized as unitary sections at the factory or before installation and, consequently, no subsequent fitting or matching is required when installing said sections. These steel lumber sections may be handled as complete units, and the tongue and slot members provide means whereby they may be easily and readily assembled one section to another in a building construction. Therefore the labor required for erecting a building construction utilizing this present invention is reduced to a minimum. Moreover, the steel lumber sections are self-sustaining and may be completely installed at one time. Moreover, my present steel lumber provides a durable and permanent building construction which is fire-proof, inasmuch as wooden flooring, wooden lathing, and wooden studding, have been completely supplanted by employing my self-contained steel lumber sections.

In Fig. 6 a modification of a means for connecting a sustaining plate portion of one lumber section to the studding portion of an adjoining lumber section is shown. This means consists of a hole 9 adjacent one end of the sustaining plate portion 2ᵇ, a similar hole 9ᵃ in the flange 5ᵃ of the adjoining studding portion, concentric with the first mentioned hole and a holding pin 10 inserted therein. These pins 10 are provided with split bifurcated shanks of a resilient character so that when the pin is inserted in the hole, the shanks are squeezed together and when they protrude through the opening, they spring apart, assuming their normal state and locking the associated elements together. It should be noticed in consideration of the foregoing, that when the steel lumber sections are laid in an adjoining relation there is no access to the space between the surfaces of the two sustaining plate members and therefore no tool can be inserted to fasten the adjacent sustaining plate to the studding portion. As a consequence, particular attention has been paid to these securing means.

In Fig. 7 a U-shaped steel lumber combination section is shown made up of a plurality of members that are welded or otherwise permanently secured to one another to form a self-contained unitary structure. The studding portion comprises a relatively thick plate 11 at each end of which are welded, or otherwise secured, relatively thin sustaining portions 12 and 13 extending laterally therefrom in the same direction and bent back upon themselves at a short distance from the studding portion to form flanges 14 and 15. The flanges 15 thus formed has its lower surface preferably coplanar with the lower surface of the lathing portion 13 and receives the offset edge of the adjoining lathing portion while the flange 14, by reason of an offset in the plane of the sustaining plate member 12, is depressed below the upper surface of the flooring portion, thereby providing a recess 16 in order that the outer edge of the flooring portion of the next adjoining section may rest upon the flange 14 and, at the same time, permit of this flooring portion and that of the adjoining lumber section being in the same plane. In this instance, as shown in Fig. 8, the securing means illustrated in Fig. 6 have been utilized to fasten the adjoining sections together.

Reference may now be had to Figs. 9 and 10 wherein a modified form of U-shaped self-contained steel lumber combination section embodying another form of my invention is illustrated. Herein, the studding portion is formed of a commercial I beam 17 with the sustaining plate portions welded, or otherwise secured to the flanged upper and lower portions thereof. The upper sustaining plate portion or flooring 18 extends laterally from substantially the center of the upper flange of the I beam, while the lower sustaining plate portion or lathing 19 extends across the whole of the flange portion of the I beam and laterally therefrom. The edge of the adjoining upper sustaining plate member 18 rests on the unoccupied portion of the upper flange, and in order that it may be secured thereto, registering apertures are drilled in the sustaining-plate edge and the flange, into which is inserted a pin such as is described in Fig. 6.

The lower sustaining plate members or lathing 19 are located in the same plane, the edge of the sustaining members being offset to rest on the upper side of the flange.

While my present steel lumber sections have been shown in most of the drawings as being incorporated into a building construction to serve as joists, upper flooring and lathing for a ceiling under said flooring, it may be readily observed that my steel lumber sections or combination sections may serve in a similar fashion as studs, inner and outer lathing, or as any equivalent combinations in building construction.

While several embodiments of this invention have been herein shown and described, it is to be understood that these are typical and not all inclusive, and that I do not desire to be limited to the specific structures shown and described since many modifications may be made without departing from the spirit and scope of the appended claims.

I claim:

1. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other.

2. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other, said first sustaining plate portion having an offset in its plane to provide a recess portion to engage the edge of an adjacent lumber section whereby the several steel lumber sections when in an assembled position have their sustaining plate portions contiguous and coincide in a common plane.

3. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other, said first sustaining plate portion having a plurality of rows of adjacent spaced-apart slits, the material between alternate slits being deformed to extend above the plane of the surface of said sustaining plate portion and the material between the intermediate slits being deformed to extend below the plane of the surface of said sustaining plate portion.

4. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other and said second sustaining plate portion being corrugated to form a reenforcing therefor.

5. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other, said first sustaining plate portion having an offset in its plane to provide a recess portion to engage the edge of the sustaining plate portion of an adjacent lumber section, and attaching means associated therewith comprising spaced apertures adapted to receive attaching devices to secure said sustaining plate portions to said studding portions of adjoining lumber sections.

6. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other, said first sustaining plate portion having an offset in its plane to provide a recess portion to engage the edge of the sustaining plate portion of an adjacent lumber section, and a plurality of tongue members formed integrally with said sustaining plate portion projected through spaced apertures formed in said flanges to secure said sustaining plate portion to said studding portions of adjoining lumber sections.

7. A steel lumber section comprising a relatively thick studding portion that serves as a building-supporting element, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being integrally formed and parallel to each other, said first sustaining plate portion having an offset in its plane to provide a recess portion to engage the edge of the sustaining plate portion of an adjacent lumber section, said recess portion and said edge of the sustaining plate portion having a plurality of spaced-apart registering apertures adjacent their outer edges, and fastening devices comprising pins provided with split bifurcated shanks of a resilient character which, after being forced through said registering apertures, spring apart to secure said sustaining plate portions to said studding portions of adjoining lumber sections.

8. A steel lumber combination section comprising a relatively thick supporting studding portion, a relatively thin sustaining plate portion constituting a lathing portion extending laterally from said studding portion adjacent to one of its edges and bent back upon itself in the opposite direction to form a flange, and a second relatively thin sustaining plate portion extending laterally from said studding portion adjacent to one of its edges and bent back upon itself in the opposite direction to form a flange, said sustaining plate portions being permanently secured to said studding portion and parallel to each other.

9. A steel lumber combination section comprising a relatively thick supporting studding portion, and relatively thin sustaining plate portions extending laterally in the same direction therefrom, at least one of said sustaining plate portions being permanently secured to and extending part-way across one edge of said studding portion to form a recess which is adapted to receive the edge of the sustaining plate portion of an adjacent lumber section.

In witness whereof, I have hereunto subscribed my name.

HOWARD B. SHERMAN.